United States Patent [19]

Kohira et al.

[11] Patent Number: 5,519,552
[45] Date of Patent: May 21, 1996

[54] ROTARY DISK STORAGE UNIT AND HEAD SUSPENSION THEREFOR

[75] Inventors: Hidekazu Kohira, Odawara; Mikio Tokuyama, Tsukuba; Hiromitsu Tokisue, Ibaraki, all of Japan

[73] Assignee: Hitachi, Ltd., Tokyo, Japan

[21] Appl. No.: 273,428

[22] Filed: Jul. 11, 1994

[30] Foreign Application Priority Data

Jul. 12, 1993 [JP] Japan .................................. 5-171557

[51] Int. Cl.⁶ ................................ G11B 5/48; G11B 21/20
[52] U.S. Cl. ................................ 360/104; 360/106
[58] Field of Search ........................ 360/103, 104, 360/105, 106, 97.01, 97.02, 97.03; 369/44.17

[56] References Cited

U.S. PATENT DOCUMENTS

| | | | |
|---|---|---|---|
| 4,520,555 | 6/1985 | Gyi et al. | 360/104 |
| 4,819,094 | 4/1989 | Oberg | 360/104 |
| 4,996,623 | 2/1991 | Erpelding et al. | 360/104 |

FOREIGN PATENT DOCUMENTS

| | | | |
|---|---|---|---|
| 2193833 | 2/1988 | European Pat. Off. | 360/104 |
| 57-20961 | 2/1982 | Japan . | |
| 57-167162 | 10/1982 | Japan | 360/104 |
| 60-205878 | 10/1985 | Japan | 360/104 |
| 61-13471 | 1/1986 | Japan | 360/104 |
| 60-246015 | 4/1986 | Japan . | |
| 1-162212 | 6/1989 | Japan | 360/104 |
| 2-273314 | 11/1990 | Japan . | |
| 3-71477 | 3/1991 | Japan | 360/104 |
| 440680 | 2/1992 | Japan . | |

OTHER PUBLICATIONS

IBM Technical Disclosure Bulletin, J. R. Reidenbach, "Combination Suspension–Lead Cable for a Multi-gap Read/Write Lead" vol. 22, No. 4 Sep. 1979.

*Primary Examiner*—Stuart S. Levy
*Assistant Examiner*—David L. Ometz
*Attorney, Agent, or Firm*—Antonelli, Terry, Stout & Kraus

[57] ABSTRACT

In a head suspension, a gimbal spring is constituted by a flexible sheet having an electrical circuit formed on its surface, and a through hole is formed through that portion of a metal load beam overlying the gimbal spring. The load beam is bonded integrally to the gimbal spring to form the head suspension. There is also disclosed a rotary disk storage unit incorporating such a head suspension.

21 Claims, 8 Drawing Sheets

ROTARY DISK STORAGE UNIT AND HEAD SUSPENSION THEREFOR

BACKGROUND OF THE INVENTION

This invention relates to a rotary disk storage (memory) unit and a head suspension used in the storage unit, and more particularly to a rotary disk storage unit of a small size capable of high-precision positioning, and also to a head suspension for such a storage unit.

In a rotary disk storage unit, a head suspension presses a pneumatic bearing slider against a rotary disk recording medium. More specifically, the head suspension comprises a load beam of a sufficiently high rigidity to press the pneumatic bearing slider (having a transducer mounted thereon) against the rotary disk recording medium under a predetermined load, and a gimbal spring of a sufficiently low rigidity to allow the pneumatic bearing slider to follow fluctuations of the rotary disk recording medium. When the rotary disk storage unit is in its inoperative or deactivated condition, the pneumatic bearing slider is held in contact with the rotary disk recording medium. When the rotary disk storage unit is operated or activated, the rotary disk recording medium is rotated, so that a flying force due to an air stream between the pneumatic bearing slider and the rotary disk recording medium is produced, and the pneumatic bearing slider flies stably at a position where the flying force is balanced with the pressing load. Electrical connection between electrodes of the transducer formed on the pneumatic bearing slider and a read/write circuit of the rotary disk storage unit is made through tube-covered conductors (wires), and these tube-covered conductors are arranged over the head suspension.

When the rotary disk storage unit becomes smaller in size, so that the spacing between the adjacent rotary disk recording media becomes smaller, the pneumatic bearing slider and the head suspension need to be reduced in size. In order to achieve a small-size design of the head suspension, a type of head suspension in which a load beam and a gimbal spring are formed integral with each other has been put into practical use. Also, the pneumatic bearing slider has become smaller in size year after year.

With the small-size design of the pneumatic bearing slider and the head suspension, the tube-covered conductors become large relative to the pneumatic bearing slider and the head suspension, and the rigidity of the tube-covered conductors may lower the ability of the pneumatic bearing slider to follow fluctuation of the rotary disk recording medium, and also the tube-covered conductors may be cut upon contact with the surface of the rotary disk recording medium.

In the field of rotary disk storage units and particularly magnetic disk units, in order to obtain an increased storage capacity, a magneto-resistive transducer (hereinafter referred to as "MR head") suited for high-density recording has been developed. Since the MR head is a read-only head, an inductive head of a conventional type for writing purposes must be mounted, together with the MR head, on a pneumatic bearing slider, and as a result four tube-covered conductors in all are required for read/write purposes. Therefore, the rigidity of the tube-covered conductors is greater as compared with the case where two tube-covered conductors are used as in a read/write inductive head, and the load due to such increased rigidity tends to adversely affect the ability of motion of the pneumatic bearing slider.

On the other hand, Japanese Patent Unexamined Publication No. 1-162212 discloses a method in which instead of using tube-covered conductors, there is used a flexible sheet containing a plurality of conductors. In this construction, a flexible sheet is bonded to a head suspension comprising a metal load beam and a gimbal spring, and electrodes of a transducer are electrically connected to a read/write circuit of a rotary disk storage unit by conductors contained in this flexible sheet. With this construction, although there is no fear of cutting of the conductors, it is difficult to achieve a small-size design of the head suspension. Also, there is a possibility that a load due to the rigidity of the flexible sheet adversely affects the ability of motion of the pneumatic bearing slider at that portion where the flexible sheet is connected to the electrodes of the transducer formed on the pneumatic bearing slider.

Japanese Patent Unexamined Publication No. 3-71477 discloses a method in which a flexible sheet, having an electrical circuit formed thereon, is used instead of a head suspension, which drives the negative-pressure air bearing slider. In this construction, there is no fear of cutting of conductors, and the head suspension can be of a small size. However, the negative-pressure air bearing slider is supported by the flexible sheet in a cantilevered condition, and therefore when the negative-pressure air bearing slider is driven radially of a rotary disk recording medium by the actuator means, it is difficult to position the negative-pressure air bearing slider over the rotary disk recording medium precisely because of the low rigidity of the flexible sheet in the radial direction.

SUMMARY OF THE INVENTION

It is an object of this invention to solve the problems of the prior art as well as the above problems.

Another object of the invention is to provide a rotary disk storage unit having a head suspension which is suited for achieving a small-size design of the rotary disk storage unit, which eliminates the possibility of cutting of conductors due to contact with a rotary disk recording medium, and which has sufficient rigidity when driving a pneumatic bearing slider radially of the rotary disk recording medium by an actuator means, thereby enabling high-precision positioning of the pneumatic bearing slider.

A further object of the invention is to provide such a head suspension.

According to one aspect of the present invention, there is provided a rotary disk storage unit comprising:

at least one rotary disk recording medium having a data surface capable of recording information;

means for rotating the rotary disk recording medium about an axis generally perpendicular to the recording medium;

a pneumatic bearing slider having a transducer mounted thereon for writing and reading data relative to the data surface;

actuator means for moving the pneumatic bearing slider to a desired position on the data surface; and a head suspension interconnecting the pneumatic bearing slider and the actuator means:

the head suspension comprising a load beam having such a rigidity that the load beam presses the pneumatic bearing slider against the rotary disk recording medium under a predetermined load, and a gimbal spring having such a rigidity as to allow the pneumatic bearing slider to follow fluctuation of the rotary disk recording medium;

wherein the load beam has a through hole in that portion thereof where the gimbal spring is mounted, the through hole being generally equal in size to the gimbal spring; and wherein the gimbal spring is constituted by a flat flexible sheet having an electrical circuit formed on at least one face thereof, the flexible sheet being adhesively bonded integrally to the load beam.

According to another aspect of the present invention, there is provided a head suspension for a rotary disk storage unit, comprising a load beam having such a rigidity that the load beam presses a pneumatic bearing slider, having a transducer mounted thereon, against a rotary disk recording medium under a predetermined load; and a gimbal spring having such a rigidity as to allow the pneumatic bearing slider to follow fluctuations of the rotary disk recording medium;

wherein the load beam has a through hole in that portion thereof where the gimbal spring is mounted, the through hole being generally equal in size to the gimbal spring; and wherein the gimbal spring is constituted by a flat flexible sheet having an electrical circuit formed on at least one face thereof, the flexible sheet being adhesively bonded integrally to the load beam.

In the above construction, the gimbal spring is constituted by the flexible sheet having the electrical circuit formed thereon, and the through hole is formed through that portion of the metal load beam at which the gimbal spring is mounted, and the load beam and the flexible sheet are adhesively bonded together in an integral manner to provide the head suspension. With this arrangement, the head suspension can be of a small size, and besides, there is no fear of cutting of conductors due to contact with the rotary disk recording medium. Moreover, since the rigidity of the head suspension in the positioning direction is determined by the rigidity of the load beam, high-precision positioning can be achieved.

DESCRIPTION OF THE PREFERRED EMBODIMENTS

Preferred embodiments of the present invention will now be described with reference to the drawings.

Figure 1:
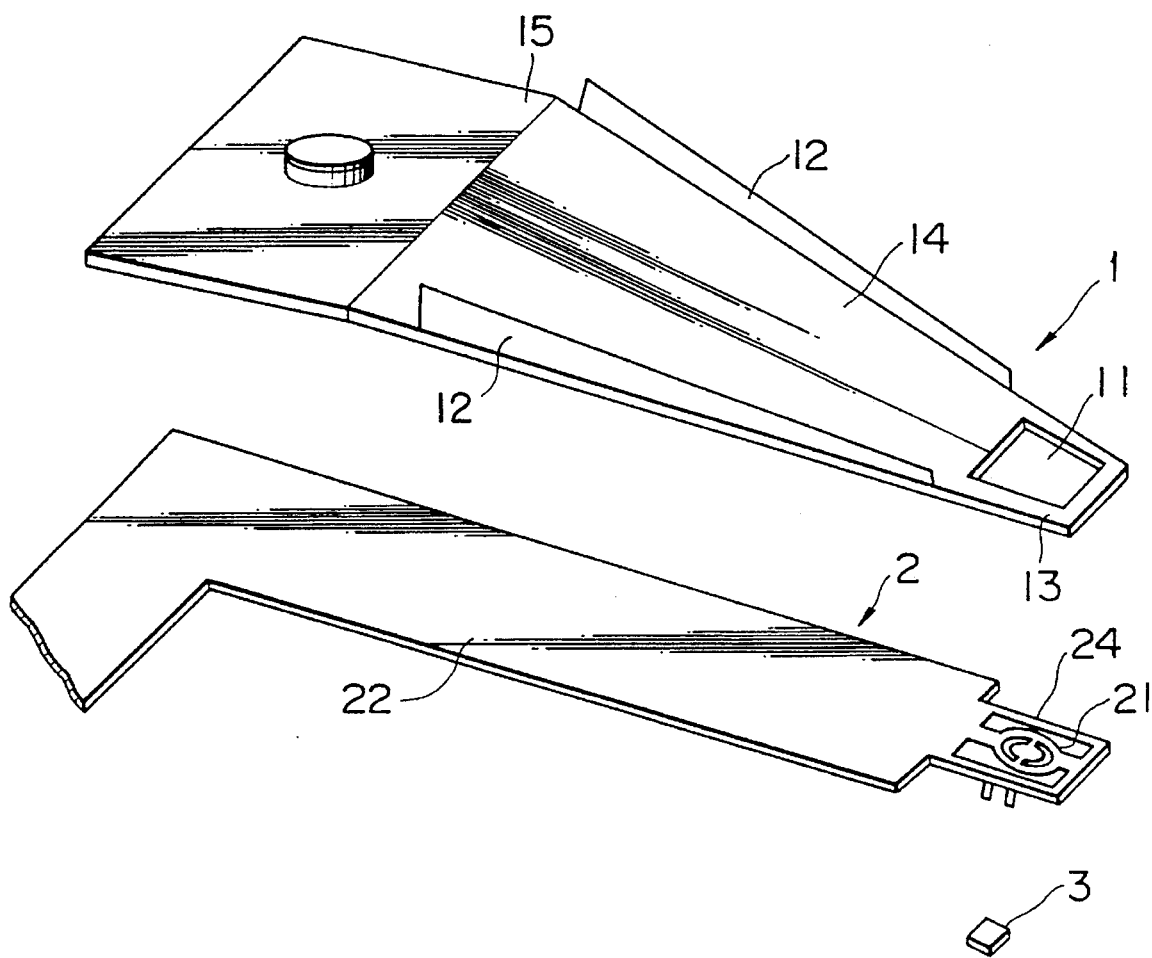
FIG. 1 is a perspective view showing constituent elements of a head suspension according to a first embodiment of the present invention.

FIGS. 1 to 6 show a first embodiment of the present invention. FIG. 1 is a perspective view showing constituent elements of a head suspension of the first embodiment. This head suspension comprises a metal load beam 1, a flat flexible sheet 2 of an electrically-insulating material having an electrical circuit formed on one surface or side thereof, and a pneumatic bearing slider 3 having a transducer mounted thereon, the flexible sheet 2 having a gimbal spring portion 21 formed on that end thereof on which the pneumatic bearing slider 3 is mounted. The pneumatic bearing slider 3 is adhesively bonded to the gimbal spring portion 21 formed on the flexible sheet 2. The flexible sheet 2, having the pneumatic bearing slider 3 mounted thereon, is adhesively bonded integrally to the load beam 1 on that surface of the flexible sheet facing away from the pneumatic bearing slider 3.

The load beam 1 comprises a thin metal sheet 14 of, for example, SUS304, and a pair of flanges 12 are formed respectively on opposite side edge portions thereof to increase the rigidity of the load beam. The thin metal sheet 14 is bent to form a bent portion 15 so as to produce a spring force so that the load beam 1 can press the pneumatic bearing slider 3 against a rotary disk recording medium (not shown) under a predetermined load.

A through hole 11 is formed through that portion of the load beam 1 overlapping the gimbal spring portion 21 of the flexible sheet 2 so that the load beam 1 will not limit the movement of the gimbal spring portion 21 in rolling and pitching directions. A flexible sheet-bonding support portion 13 is formed in surrounding or delimiting relation to the through hole 11 in the load beam 1, and a gimbal spring support portion 24, surrounding the gimbal spring portion 21 of the flexible sheet 2, is adhesively bonded to the bonding support portion 13. With this arrangement, the movement of the gimbal spring portion 21 in the rolling and pitching directions is not limited. And besides, when the pneumatic bearing slider 3 is to be positioned radially of the rotary disk recording medium (not shown) by an actuator means (not shown), the rigidity of the head suspension in the positioning direction is provided by the load beam 1, and therefore high-precision positioning can be achieved.

As described above, in the head suspension of this embodiment, the gimbal spring portion 21 is formed by the flexible sheet 2, thereby increasing the degree of freedom, that is, the degree of movement of the pneumatic bearing slider 3 in the rolling and pitching directions, and the rigidity of the head suspension in the positioning direction is provided by the metal load beam 1. The electrical circuit and the gimbal spring are formed on the flexible sheet 2, and this flexible sheet 2 is bonded to the load beam 1 to provide the head suspension. With this construction, the head suspension can be of a small size, and besides there is no need to provide electrical wiring by means of tube-covered conductors, thus eliminating the possibility of the cutting of the conductors.

The gimbal spring portion of the head suspension of this embodiment will be described in further detail with reference to FIG. 2.

The flexible sheet 2 includes the gimbal spring portion 21 and a flat portion 22 having the electrical circuit formed on a surface thereof, and this flexible sheet 2 is made of, for example, a polymeric material such as polyimide and polyester. In this embodiment, four conductors 23, constituting the electrical circuit, are formed on that side or surface of the flexible sheet 2 to which the pneumatic bearing slider 3 is mounted. This circuit design is intended for use with an MR head (transducer).

Figure 2:
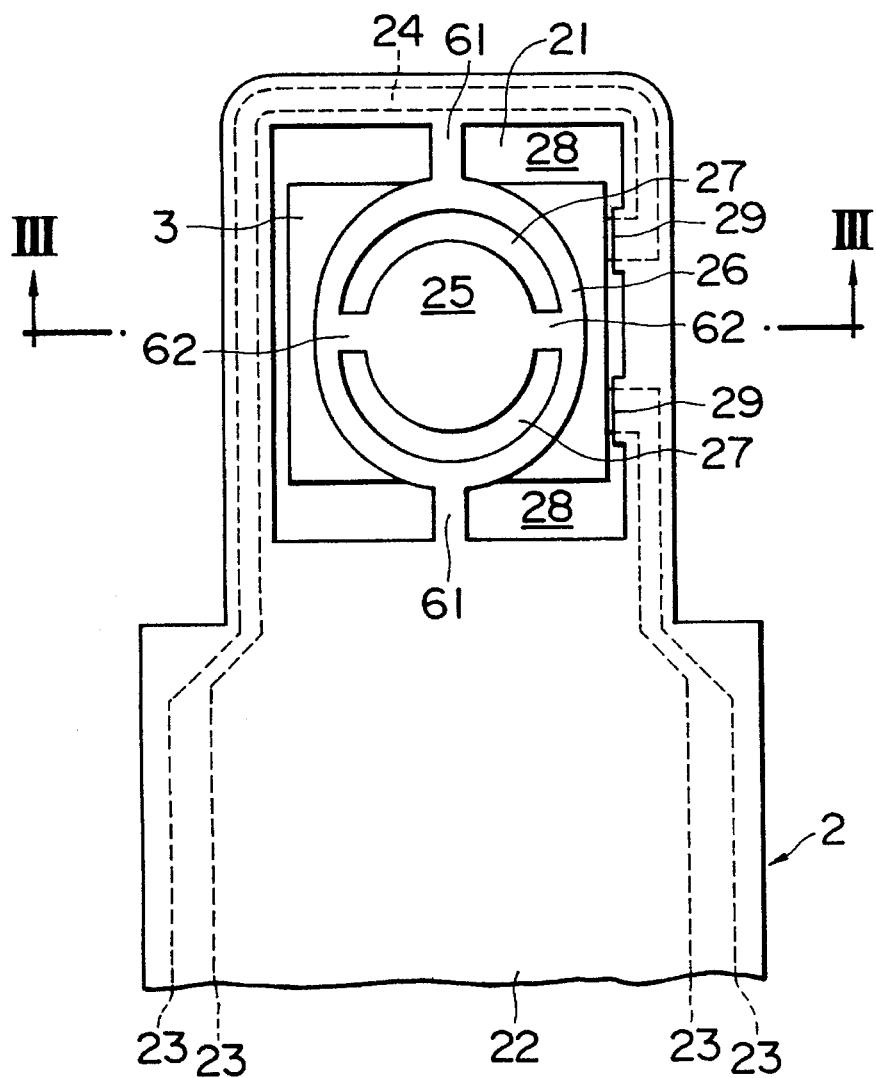
FIG. 2 is a fragmentary top plan view showing a gimbal spring portion of the head suspension of the first embodiment.
Figure 3:
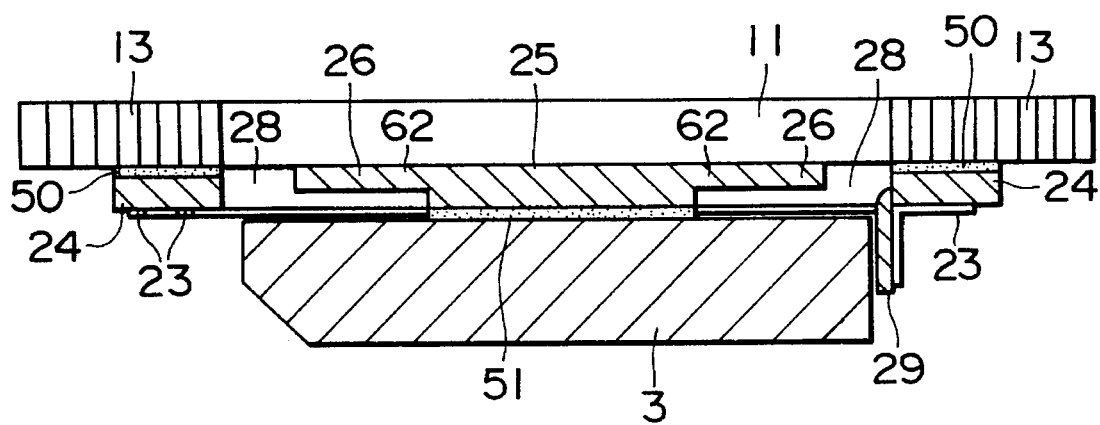
FIG. 3 is a cross-sectional view through the gimbal spring portion of the head suspension of the first embodiment with the pneumatic bearing slider affixed thereto.

As shown in FIGS. 2 and 3, the gimbal spring portion 21 has a bonding portion 25, to which the pneumatic bearing slider 3 is bonded, as depicted in FIG. 3, a thin flat portion 26 which is smaller in thickness than the bonding portion 25, and has such a thickness that it is out of contact with the pneumatic bearing slider 3, a hole 27 separating the bonding portion 25 from the thin flat portion 26, a pair of connecting portions 62 which interconnect the bonding portion 25 and the thin flat portion 26 and have the same thickness as that of the thin flat portion 26, and a pair of connecting portions 61 which interconnect the thin flat portion 26 and the gimbal spring support portion 24 on which the electrical circuit conductors 23 are provided. Except for the connecting portions 61, the gimbal spring support portion 24 is separated from the thin flat portion 26 by a through hole 28 formed through the flexible sheet 2.

Except for the gimbal spring portion 21, the flexible sheet 2 is integrally bonded to the load beam 1. The through hole 11 is formed through that portion of the load beam 1 overlapping the gimbal spring portion 21, and therefore even when the load beam 1 and the flexible sheet 2 are integrally joined together, the movement of the gimbal spring portion 21 in the rolling and pitching directions will not be limited. And besides, the gimbal spring support portion 24 surrounding the gimbal spring portion 21 is adhesively bonded and fixed to the flexible sheet-bonding support portion 13 of the load beam 1, and therefore the head suspension, even when driven to move radially of the rotary disk recording medium (not shown), has sufficient rigidity. Furthermore, since the electrical circuit conductors 23 are formed on the flexible sheet 2, there is no need to use any tube-covered conductor for connection to the electrodes of the pneumatic bearing slider, and therefore there is no fear that the conductor will contact the rotary disk recording medium and be cut.

FIG. 3 is a cross-sectional view of the gimbal spring portion of the head suspension of the first embodiment taken along the line III—III of FIG. 2 and showing the slider 3 bonded to the bonding portion 25 of the gimbal spring portion 21 through an adhesive layer 51. The thin flat portion 26 and the connecting portions 62 (which interconnect the thin flat portion 26 and the pneumatic bearing slider-bonding portion 25) are smaller in thickness than the bonding portion 25 of the gimbal spring portion 21, and therefore are not in contact with the pneumatic bearing slider 3. For making the thickness of the thin flat portion 26 and the connecting portions 62 smaller than the thickness of the bonding portion 25, there is used, for example, a method in which a copper layer is formed on the bonding portion 25, and excimer laser radiation is applied to the thin flat portion 26 and the connecting portions 62 to remove the material of the flexible sheet 2 from the surfaces thereof until these portions 26 and 62 are reduced to a predetermined thickness, and thereafter the copper layer is removed from the bonding portion 25 by etching. The gimbal spring portion 24 of the flexible sheet 2, having the electrical circuit conductors 23 formed thereon, is bonded to the flexible sheet-bonding support portion 13 of the load beam 1 by an adhesive layer 50.

A method of connecting electrodes 34 of the transducer, formed on the pneumatic bearing slider 3, to the flexible sheet 2 having the electrical circuit conductors 23 formed thereon will now be described with reference to FIGS. 4 and 5.

Figure 4:
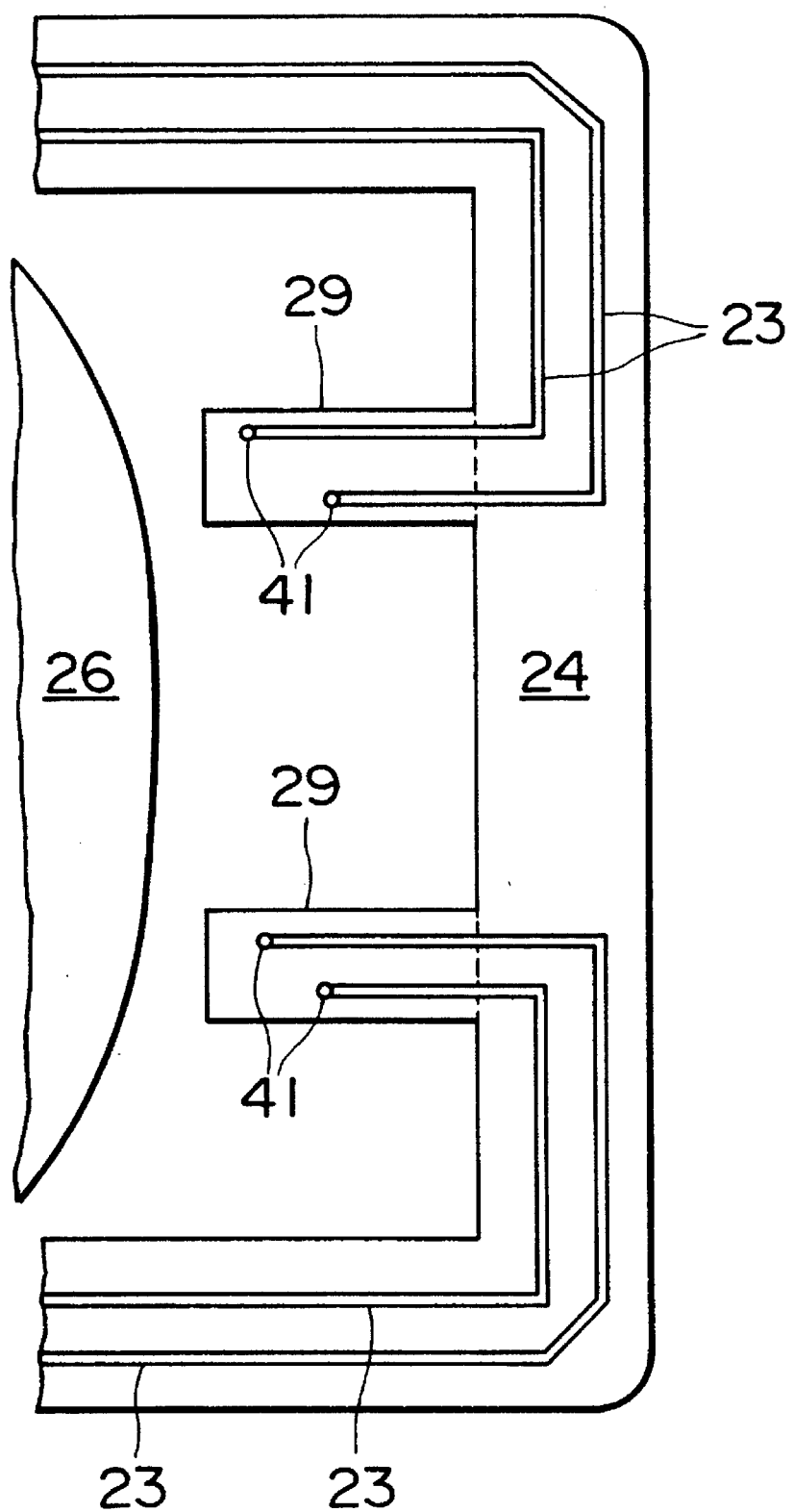
FIG. 4 is an enlarged fragmentary view showing electrode-connecting portions of a flexible sheet of the first embodiment.

FIG. 4 is an enlarged fragmentary view showing a portion of the flexible sheet 2 where the electrical circuit conductors 23 on this sheet are connected to the electrodes 34 of the transducer. Narrow portions (strips) 29 for connecting the electrodes 34 extend from the gimbal spring support portion 24 of the flexible sheet 2 toward the thin flat portion 26 of the gimbal spring, and the end portions of the electrical circuit conductors 23 extending from the gimbal spring portion 24 are formed on the narrow portions 29. The narrow portions 29 should be as narrow or thin as possible so that their rigidity will not adversely affect the ability of motion of the pneumatic bearing slider 3. For providing such narrow portions 29, the spacing between the adjoining electrical circuit conductors 23 is reduced as much as possible, and the flexible sheet is processed, for example, by an excimer laser so that the width of the flexible sheet can be reduced as much as possible.

Figure 5:
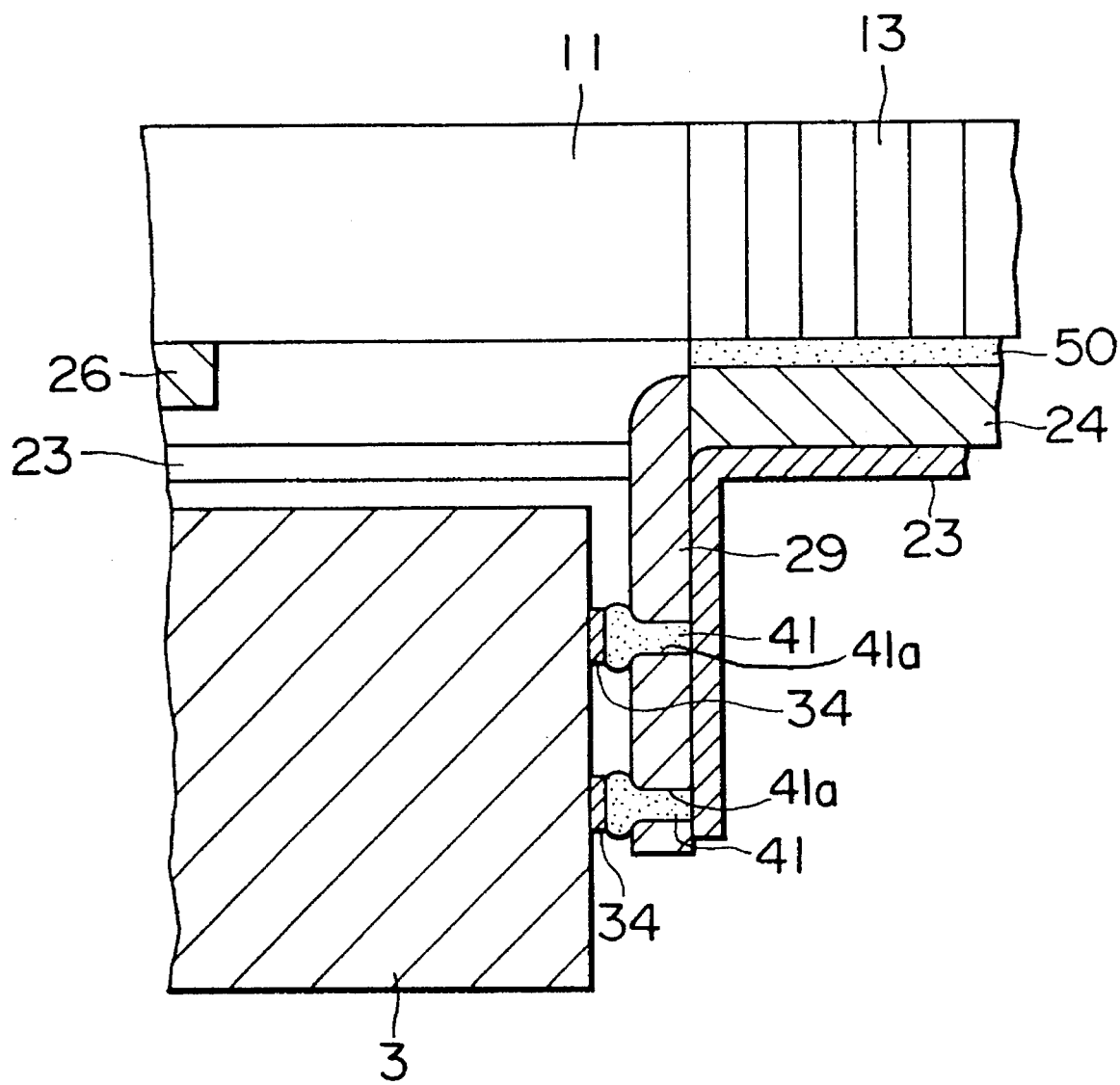
FIG. 5 is an enlarged fragmentary cross-sectional view showing the electrode-connecting portions of the head suspension of the first embodiment.

FIG. 5 is an enlarged fragmentary cross-sectional view showing a portion where the electrical circuit conductors 23, formed on the narrow portions 29 constituted by the flexible sheet, are connected to the electrodes 34 of the transducer formed on the pneumatic bearing slider 3. Holes 41a are formed through the narrow portion 29, and open to the electrical circuit conductors 23, and a bump 41 of solder, gold or copper is formed in each of the holes 41a. The electrodes 34 of the transducer formed on the pneumatic bearing slider 3 are electrically connected to the electrical circuit conductors 23 on the narrow portions 29 (constituted by the flexible sheet) through bumps 41. The bumps 41 electrically connect the associated electrode 34 and electrical circuit conductor 23 together by means of thermal compressive bonding or the like.

Figure 6:
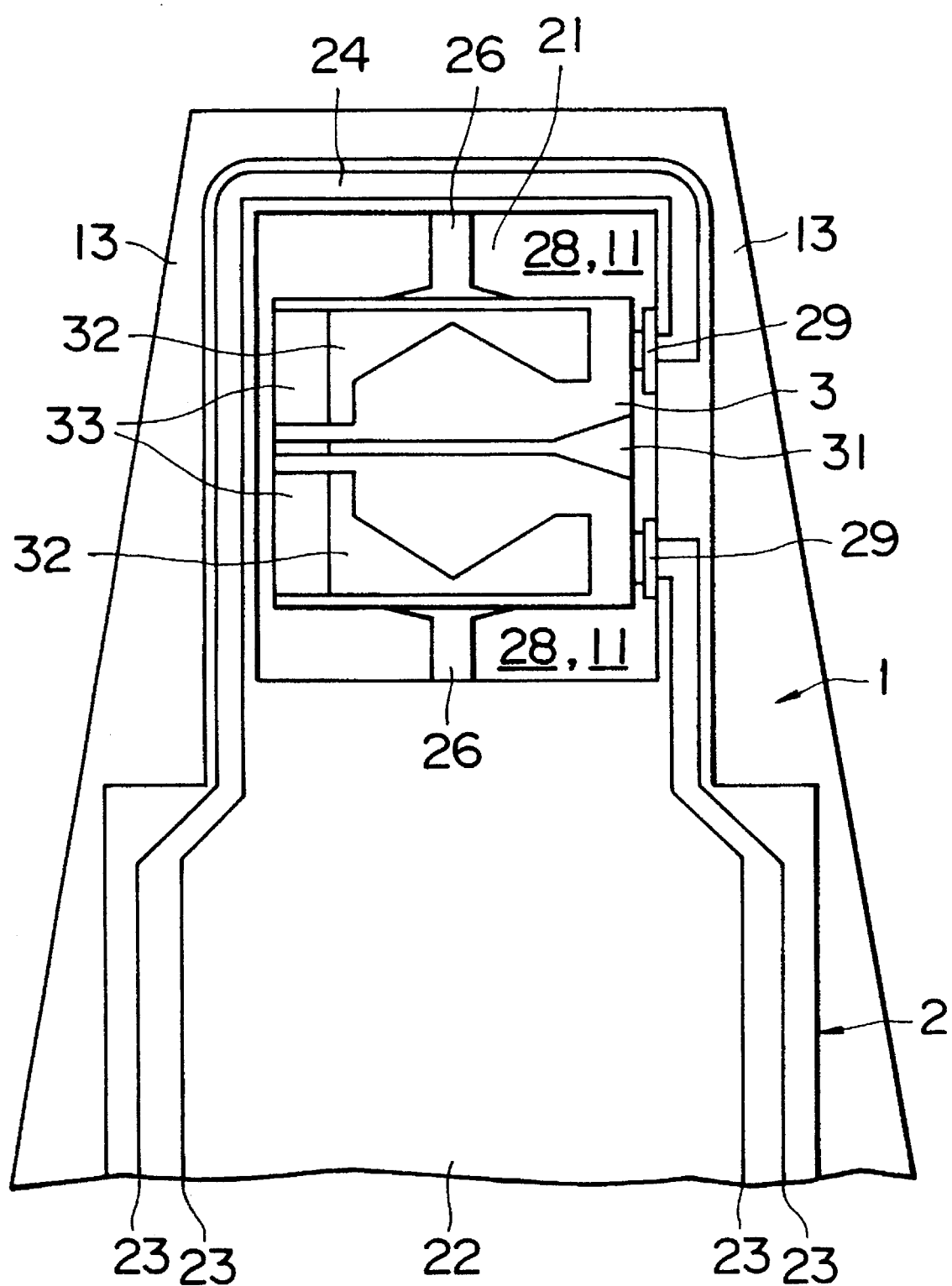
FIG. 6 is a top plan view of a portion of the head suspension of the first embodiment.

FIG. 6 is a plan view of the head suspension of the first embodiment as viewed from the bottom side of the pneumatic bearing slider 3. The pneumatic bearing slider 3 comprises side rails 32 provided respectively at opposite widthwise end portions thereof, and a center rail 31 disposed generally centrally of the width thereof and extending from an air inlet side to an air outlet side. A tapered surface 33 is formed at an air inlet side of each side rail 32 and of center rail 31.

Figure 7:
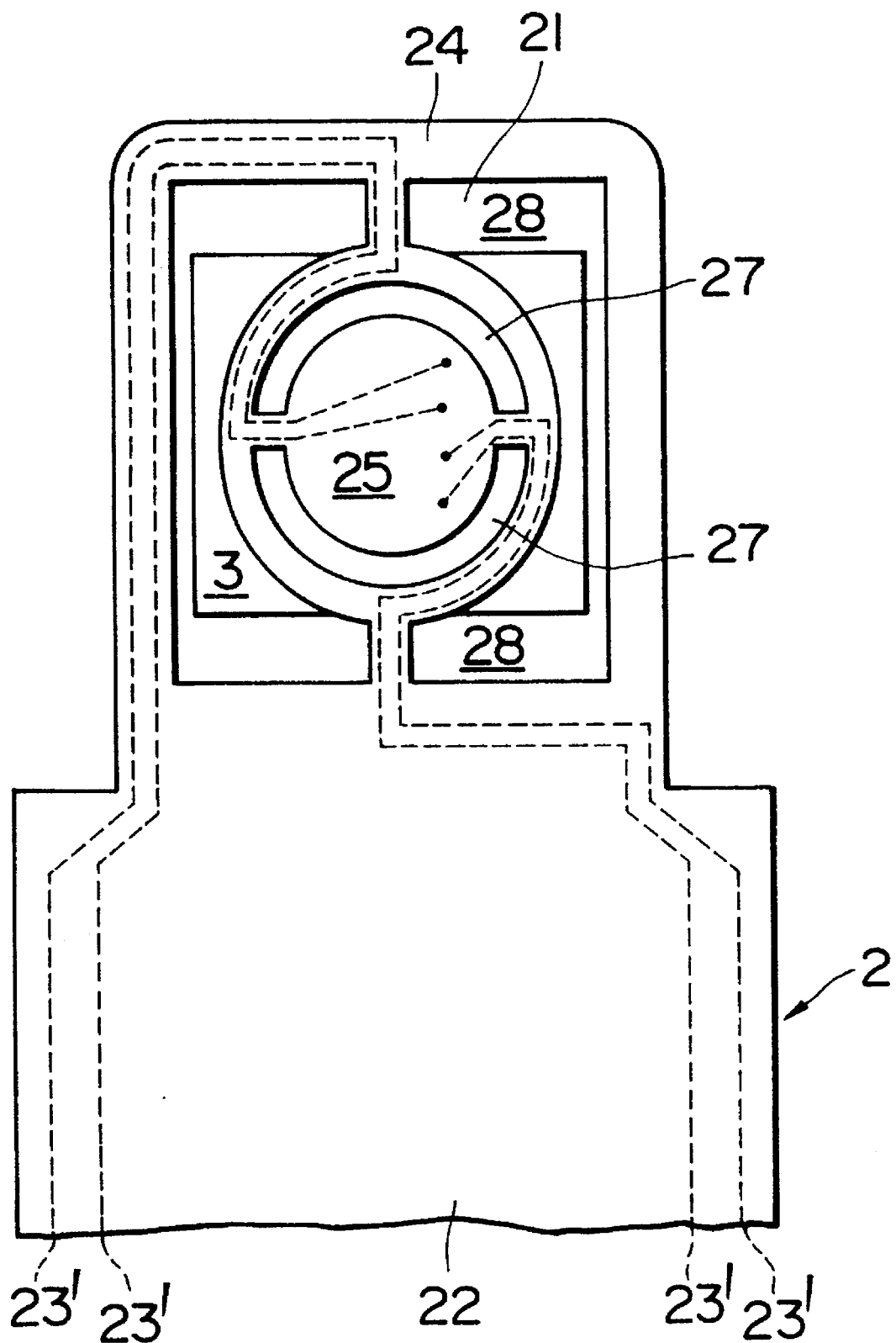
FIG. 7 is a top plan view showing a gimbal spring portion of a head suspension according to a second embodiment of the present invention.

FIG. 7 is a top plan view showing a gimbal spring portion of a head suspension according to a second embodiment of the present invention. In this embodiment, electrodes are formed on the opposite surface from the air bearing surface and a pattern of electrical circuit conductors 23' is shown in FIG. 7. In this case where the electrodes are thus formed on the opposite surface from the air bearing surface, the connection between the electrodes and the electrical circuit conductors 23' is effected on the bonding portion 25 of the gimbal spring portion 21 to which the pneumatic bearing slider 3 is bonded. In this case, in contrast with the first embodiment, the rigidity of the narrow portions 29 constituted by the flexible sheet does not act on the pneumatic bearing slider 3 at all, and therefore the rolling and pitching movement of the pneumatic bearing slider 3 will not be adversely affected.

Figure 8:
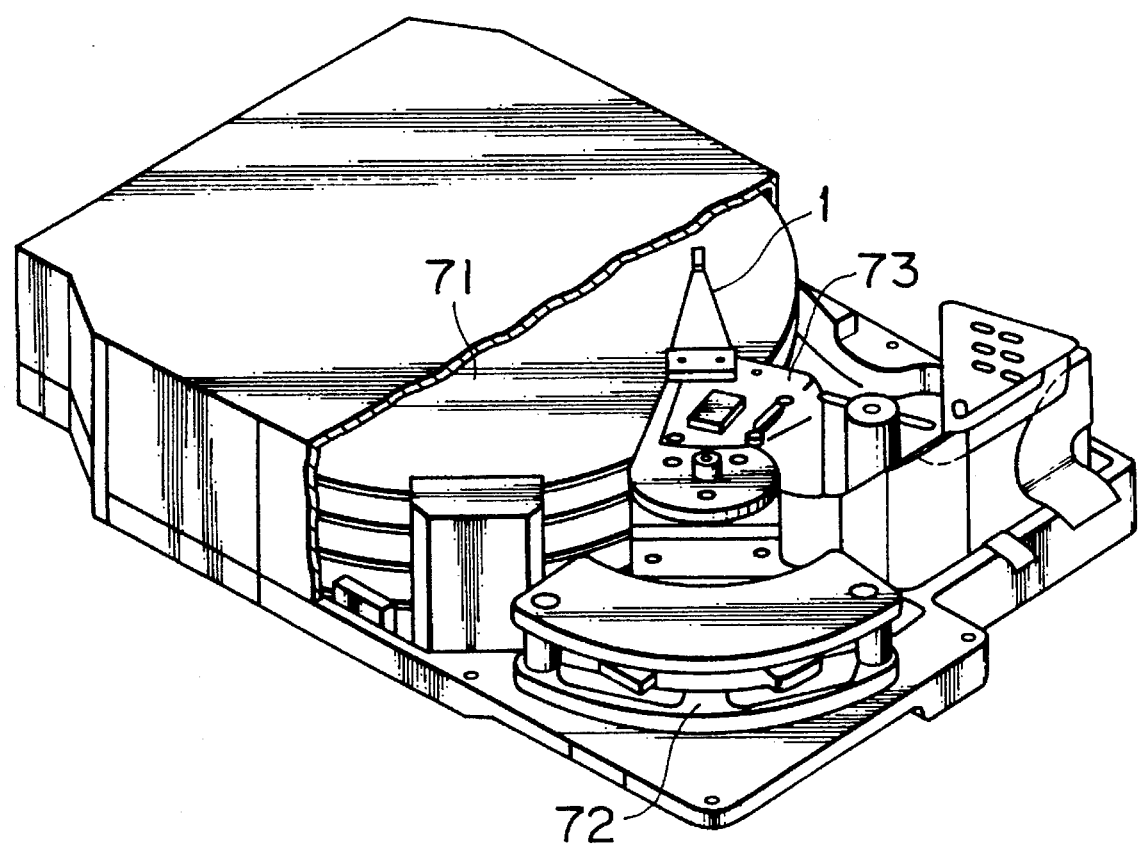
FIG. 8 is a partly-broken, perspective view of a rotary disk storage unit incorporating a head suspension of the present invention.

FIG. 8 is a partly-broken, perspective view of a rotary disk storage unit incorporating a head suspension of the present invention. Each rotary disk recording medium 71 is driven for rotation by a motor (not shown), and a stream of the air is introduced from the tapered surface side of a pneumatic bearing slider 3, thereby causing the pneumatic bearing slider 3 to fly. The head suspension is mounted on an actuator means 73, and the actuator means 73 is driven for rotation by a voice coil motor 72. The head suspension is movably positioned at high speed over the rotary disk recording medium 71 by the actuator means 73 driven by the voice coil motor 72. The rigidity of the head suspension of the present invention in a direction radially of the rotary disk recording medium 71 is determined by the rigidity of a load beam 1, and therefore a sufficiently high rigidity to effect high-precision positioning can be obtained.

Figure 9:
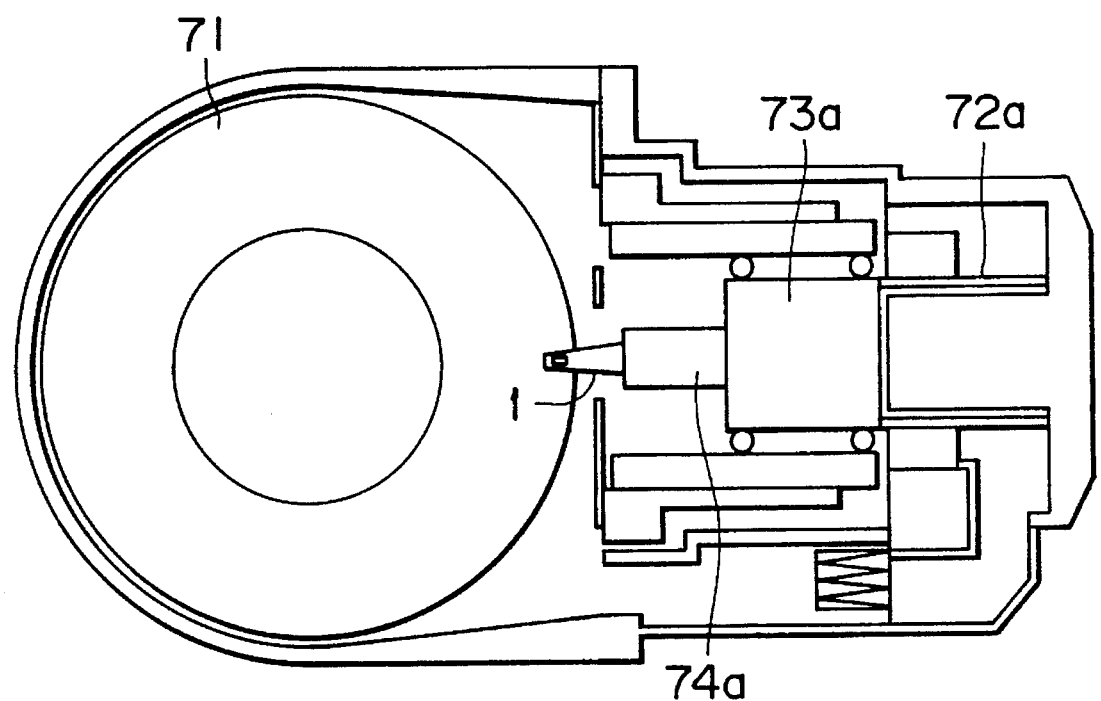
FIG. 9 is a top plan view of another embodiment of a rotary disk storage unit incorporating a head suspension of the present invention.

FIG. 9 is a top plan view of another embodiment of a rotary disk storage unit incorporating a head suspension of the present invention. This storage unit differs from the rotary disk storage unit of FIG. 8 in that the head suspension is mounted on an actuator 73a through a guide arm 74a, and that the actuator 73a is linearly driven by a voice coil motor 72a. Thus, the head suspension of the present invention can be mounted not only on the rotary-type storage unit (FIG. 8) but also on the linear-type rotary disk storage unit as shown in FIG. 9, in which case similar effects to those in the storage unit of FIG. 8 can also be achieved.

Figure 10:
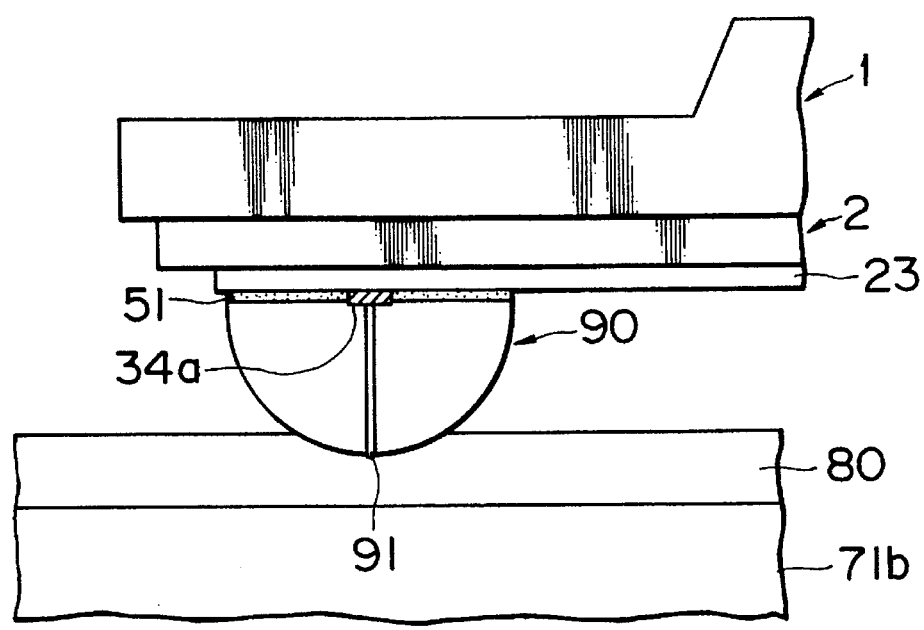
FIG. 10 is an enlarged side-elevational view of a further embodiment of a rotary disk storage unit incorporating a head suspension of the present invention.

FIG. 10 is a an enlarged, side-elevational view of a further embodiment of a rotary disk storage unit incorporating a head suspension of the present invention. This rotary disk storage unit differs from those of FIGS. 8 and 9 in that a thicker film 80 of a lubricating material is coated on a rotary disk recording medium 71b, as compared with the storage units of FIGS. 8 and 9, and that a semi-spherical chip 90 is disposed in liquid lubricating relation or interface lubricating relation to this lubricating film. The semi-spherical chip 90 is used instead of the pneumatic bearing slider, and a transducer 91 is formed generally on the apex of the semi-spherical chip 90. The semi-spherical chip 90 is bonded at its flat surface to a gimbal spring (constituted by a flexible sheet) through an adhesive layer 51, and electrodes 34a formed on this flat surface are electrically connected to electrical circuit conductors 23 formed on the flexible sheet 2. The chip 90 may have any other suitable shape than a semi-spherical shape, such as a cylindrical shape, a rectangular parallelepipedic shape, and a shape defined by combining such shapes.

In the above embodiments, although the electrical circuit conductors are formed on one surface of the flexible sheet, they may be formed on both surfaces or sides of the flexible sheet, in which case each surface of the flexible sheet is covered with an electrically-insulative sheet after the formation of the electrical circuit conductors.

As described above, in the present invention, there can be provided a head suspension which is suited for achieving a small-size design of the rotary disk storage unit, eliminates the possibility of the cutting the conductors due to contact of wires with the rotary disk recording medium, and has sufficient rigidity when driving the pneumatic bearing slider radially of the rotary disk recording medium by the actuator means, thereby enabling high-precision positioning of the pneumatic bearing slider. Also, there can be provided a rotary disk storage unit incorporating such head suspension.

What is claimed is:

1. A rotary disk storage unit for use with a rotary disk recording medium having a data surface capable of recording information, said rotary disk storage unit comprising:

means for rotating the rotary disk recording medium about an axis generally perpendicular to the recording medium;

a head suspension including a load beam member having a through hole passing through one end thereof, with a bonding support portion circumscribing the through hole; and a gimbal spring member having a support portion and a bonding portion gimballed within said gimbal spring member support portion for pivoting about two orthogonal axes, said bonding portion having a size substantially equal to the size of the through hole, said gimbal spring member being bonded to one side of said load beam member with said load beam member bonding support portion bonded to said gimbal spring member support portion and with said gimbal spring member bonding portion within the through hole;

a pneumatic bearing slider bonded to the side of said gimbal spring member bonding portion opposite said load beam member and having a transducer mounted thereon; and actuator means for driving said head suspension to move said pneumatic bearing slider to a position on the data surface of the rotary disk storage medium;

wherein said load beam member has sufficient rigidity to press said pneumatic bearing slider against the rotary disk recording medium under a predetermined load; and wherein said gimbal spring member is formed of a flat flexible sheet having an electrical circuit formed on at least one face thereof and has sufficient rigidity to allow said pneumatic bearing slider to follow fluctuations of the rotary disk recording medium, said flexible sheet being bonded integrally to said load beam member.

2. A rotary disk storage unit according to claim 1, in which said pneumatic bearing slider has electrodes formed on a surface thereof opposite a flying face of said slider, on which said transducer is mounted, and said electrodes are connected to said flat flexible sheet electrical circuit at that portion of said gimbal spring member bonding portion to which said pneumatic bearing slider is bonded.

3. A rotary disk storage unit according to claim 1 or claim 2, in which said transducer is a read-only magneto-resistive transducer.

4. A rotary disk storage unit according to claim 1, wherein said gimbal spring member support portion includes a support ring circumscribing said bonding portion, said pneumatic bearing slider includes electrodes for said transducer, said support ring includes narrow strips extending to said electrodes and having electric conductors formed thereon and contiguous to said support ring.

5. A rotary disk storage unit according to claim 1, wherein said gimbal spring member support portion includes:

a first flat portion having said electrical circuit formed thereon;

a second flat portion, thinner than said bonding portion and having a thickness so as to be out of contact with said pneumatic bearing slider;

a first connecting portion connecting said bonding portion and said second flat portion to each other while defining an opening therebetween, said first connecting portion having substantially the same thickness as said second flat portion; and a second connecting portion connecting said second flat portion to said first flat portion, while defining an opening therebetween.

6. A rotary disk storage unit for use with a rotary disk recording medium having a lubricating material coated on a data surface thereof, on which information is recorded, said rotary disk storage unit comprising:

means for rotating the rotary disk recording medium about an axis generally perpendicular to the recording medium;

a head suspension including a load beam member having a through hole passing through one end thereof, with a bonding support portion circumscribing the through hole; and a gimbal spring member having a support portion and a bonding portion gimballed within said gimbal spring member support portion for pivoting about two orthogonal axes, said bonding portion having a size substantially equal to the size of the through hole, said gimbal spring member being bonded to one side of said load beam member with said load beam member bonding support portion bonded to said gimbal spring member support portion and with said gimbal spring member bonding portion within the through hole;

a chip bonded to the side of said gimbal spring member bonding portion opposite said load beam member and having a transducer mounted thereon; and actuator means for driving said head suspension to move said chip to a position on the data surface of the rotary disk recording medium;

wherein said load beam member has sufficient rigidity to press said chip against the rotary disk recording medium under a predetermined load; and wherein said gimbal spring member is formed of a flat flexible sheet having an electrical circuit formed on at least one face thereof and has sufficient rigidity to allow said chip to follow fluctuations of the rotary disk recording medium, said flexible sheet being bonded integrally to said load beam member.

7. A rotary disk storage unit according to claim 6, in which said chip has a semi-spherical shape.

8. A head suspension as claimed in claim 7, in which said transducer is a read-only magneto-resistive transducer.

9. A head suspension as claimed in claim 6, in which said transducer is a read-only magneto-resistive transducer.

10. A head suspension for a rotary disk storage unit, comprising a load beam member having a through hole passing through one end thereof, with a bonding support portion circumscribing the through hole;

a gimbal spring member, including a support portion and a bonding portion gimballed within said support portion for pivoting about two orthogonal axes, said bonding portion having a size substantially equal to the size of the through hole, said gimbal spring member being bonded to one side of said load beam member with said load beam member bonding support portion bonded to said gimbal spring member support portion and with said gimbal spring member bonding portion within the through hole;

a pneumatic bearing slider bonded to the side of said gimbal spring member bonding portion opposite said load beam member and having a transducer mounted thereon; and actuator means for driving said load beam member and gimbal spring member to move said chip to a desired position on a data surface of a rotary disk storage member adjacent said pneumatic bearing slider;

wherein said load beam member has sufficient rigidity to press said pneumatic bearing slider against the rotary disk recording medium under a predetermined load; and wherein said gimbal spring member is formed of a flat flexible sheet having an electrical circuit formed on at least one face thereof and has sufficient rigidity to allow said pneumatic bearing slider to follow fluctuations of the rotary disk recording medium, said flexible sheet being bonded integrally to said load beam member.

11. A head suspension as claimed in claim 10, in which said pneumatic bearing slider has electrodes formed on a surface thereof opposite a flying face of said slider, on which said transducer is mounted, and said electrodes are connected to said flat flexible sheet electrical circuit at that portion of said gimbal spring member bonding portion to which said pneumatic bearing slider is bonded.

12. A head suspension as claimed in claim 10 or claim 11, in which said transducer is a read-only magneto-resistive transducer.

13. A rotary disk storage unit according to claim 10, wherein said gimbal spring member support portion includes a support ring circumscribing said bonding portion, said pneumatic bearing slider includes electrodes for said transducer, said support ring includes narrow strips extending to said electrodes and having electric conductors formed thereon and contiguous to said support ring.

14. A rotary disk storage unit according to claim 10, wherein said gimbal spring member support portion includes:

a first flat portion having said electrical circuit formed thereon;

a second flat portion, thinner than said bonding portion and having a thickness so as to be out of contact with said pneumatic bearing slider;

a first connecting portion connecting said bonding portion and said second flat portion to each other while defining an opening therebetween, said first connecting portion having substantially the same thickness as said second flat portion; and a second connecting portion connecting said second flat portion to said first flat portion while defining an opening therebetween.

15. A head suspension for a rotary disk storage unit, comprising:

a pneumatic bearing slider having a transducer mounted thereon;

a load beam member having a through hole passing through an end thereof; and a gimbal spring member having a mounting portion pivotably mounting said pneumatic bearing slider for gimballed movement about two orthogonal axes, said mounting portion being generally equal in size to the size of the through hole;

wherein said load beam member has sufficient rigidity to press said transducer against a rotary disk recording medium under a predetermined load; and wherein said gimbal spring member is formed of a flat flexible sheet having an electrical circuit formed on at least one surface thereof and has sufficient rigidity to allow said pneumatic bearing slider to follow fluctuations of the rotary disk recording medium; and wherein said load beam member through hole overlies said gimbal spring member mounting portion, with the remainder of said flexible sheet being bonded integrally to said load beam member.

16. A rotary disk storage unit according to claim 15, wherein said flexible sheet includes a gimbal spring support ring circumscribing said mounting portion; said load beam member includes a bonding support portion circumscribing the through hole of said load beam member, said pneumatic bearing slider includes electrodes for said transducer, said support ring includes narrow strips extending to said electrodes and having electric conductors formed thereon and contiguous to said support ring.

17. A rotary disk storage unit according to claim 15, wherein said gimbal spring member mounting portion comprises a bonding portion having said air bearing slider bonded thereon; a thin flat portion, thinner than said bonding portion and having a thickness so as to be out of contact with said air bearing slider; a first connecting portion connecting said bonding portion and said thin flat portion to each other while defining an opening therebetween, said first connecting portion having substantially the same thickness as said thin flat portion; and a second connecting portion connecting said thin flat portion to the remainder of said flexible sheet.

18. A head suspension for a rotary disk storage unit, comprising:

a load beam member having a through hole passing through one end thereof, with a bonding support portion circumscribing the through hole;

a gimbal spring member, including a support portion and a bonding portion gimballed within said support portion for pivoting about two orthogonal axes, said bonding portion having a size substantially equal to the size of the through hole, said gimbal spring member being bonded to one side of said load beam member with said load beam member bonding support portion bonded to said gimbal spring member support portion and with said gimbal spring member bonding portion within the through hole;

a chip bonded to the side of said gimbal spring member bonding portion opposite said load beam member and having a transducer mounted thereon; and actuator means for driving said load beam member and gimbal spring member to move said chip to a position on a data surface of a rotary disk storage medium adjacent said pneumatic bearing slider;

wherein said load beam member has sufficient rigidity to press said pneumatic bearing slider against the rotary disk recording medium under a predetermined load; and wherein said gimbal spring member is formed of a flat flexible sheet having an electrical circuit formed on at least one face thereof and has sufficient rigidity to allow said pneumatic bearing slider to follow fluctuations of the rotary disk recording medium, said flexible sheet being bonded integrally to said load beam member.

19. A head suspension as claimed in claim 18, in which said chip has a semi-spherical shape.

20. A head suspension for a rotary disk storage unit, comprising:

a load beam member having sufficient stiffness to press a chip, having a transducer mounted thereon, against a rotary disk recording medium under a predetermined load, the rotary disk recording medium having a lubricating material coated on a data surface thereof, the rotary disk recording medium and said chip cooperating to permit contact recording in a fluid lubricating condition; and a gimbal spring member having sufficient rigidity to allow the chip to follow fluctuations of the rotary disk recording medium;

wherein said load beam member has a through hole, and said gimbal spring member has a mounting portion, said load beam member through hole being generally equal in size to said gimbal spring member mounting portion;

wherein said gimbal spring member is formed of a flat flexible sheet having an electrical circuit formed on at least one surface thereof; and wherein said load beam member through hole overlies said gimbal spring member mounting portion, with the remainder of said flexible sheet being integrally bonded to said load beam member.

21. A rotary disk storage unit for use with a rotary disk recording medium having a data surface capable of recording information, said rotary disk storage unit comprising:

means for rotating the rotary disk recording medium about an axis generally perpendicular to the recording medium; a head suspension, including a load beam member having a through hole passing through one end thereof, with a bonding support portion circumscribing the through hole; and a gimbal spring member, including a bonding portion, a ring portion connected to said bonding portion by a first pair of connecting portions which define a first axis through the center of said bonding portion to permit said bonding portion to pivot about said first axis, a gimbal spring support portion connected to said ring portion by a second pair of connecting portions which define a second axis through the center of said bonding portion at right angles to said first axis to permit said ring portion to pivot about said second axis, and a second support portion, the combined size of said bonding portion, first pair of connecting portions, ring portion, and second pair of connecting portions being substantially equal to the size of the through hole, said gimbal spring member being affixed to one side of said load beam member with said load beam member bonding support portion bonded to said gimbal spring member support portion and with said gimbal spring member bonding portion, first pair of connecting portions, ring portion, and second pair of connection portions within the through hole;

a pneumatic bearing slider affixed to the side of said gimbal spring member bonding portion opposite said load bearing member and having a transducer mounted thereon; and actuator means for driving said head suspension to a desired position on the data surface of the rotary disk recording medium;

wherein said load spring member has sufficient rigidity to press said transducer against the rotary disk recording medium under a predetermined load; and wherein said gimbal spring member is formed of a flat flexible sheet having an electrical circuit formed on at least one face thereof and has sufficient rigidity to allow said pneumatic bearing slider to follow fluctuations of the rotary disk recording medium, said flexible sheet being bonded integrally to said load beam member.

* * * * *